United States Patent [19]

Ring et al.

[11] Patent Number: 5,367,237

[45] Date of Patent: Nov. 22, 1994

[54] ELECTROMECHANICAL ACTUATOR CONTROLLER

[75] Inventors: Jeffrey R. Ring, Palm Harbor; Reinhold Matulenko, Clearwater, both of Fla.

[73] Assignee: Honeywell Inc., Minneapolis, Minn.

[21] Appl. No.: 898,148

[22] Filed: Jun. 15, 1992

[51] Int. Cl.$^5$ .................... G05B 5/01; G05D 15/00
[52] U.S. Cl. .................... 318/616; 318/610; 318/632; 318/646
[58] Field of Search ............. 318/560–646, 318/430–434, 436; 364/434, 433, 150–169; 244/193, 191, 177

[56] References Cited

U.S. PATENT DOCUMENTS

| | | | |
|---|---|---|---|
| 3,828,238 | 8/1974 | Kobayashi et al. | 318/630 |
| 3,886,424 | 5/1975 | Hoshima et al. | 318/604 X |
| 4,051,423 | 9/1977 | Touchton et al. | 318/611 |
| 4,096,426 | 6/1978 | Tremaine et al. | 318/611 |
| 4,338,659 | 7/1982 | Kurakake | 318/561 X |
| 4,341,986 | 7/1982 | Browder | 318/618 |
| 4,345,194 | 8/1982 | Green | 318/621 |
| 4,479,098 | 10/1984 | Watson | 310/318 |
| 4,506,321 | 3/1985 | Comstock et al. | 318/561 X |
| 4,577,142 | 3/1986 | Matsumiya | 318/592 |
| 4,697,768 | 10/1987 | Klein | 318/584 X |
| 4,743,823 | 5/1988 | Fujita | 318/630 |
| 4,795,955 | 1/1989 | Yamashita | 318/632 |
| 4,797,829 | 1/1989 | Marturella et al. | 318/584 X |
| 4,914,726 | 4/1990 | Burke | 318/646 |
| 5,010,492 | 4/1991 | Kurakake et al. | 318/603 |
| 5,015,934 | 5/1991 | Holley et al. | 318/611 |
| 5,020,125 | 5/1991 | Losic et al. | 318/606 |
| 5,030,901 | 7/1991 | Futami | 318/610 |
| 5,036,266 | 7/1991 | Burke | 318/646 |
| 5,155,422 | 10/1992 | Sidman et al. | 318/560 |

Primary Examiner—Paul Ip
Attorney, Agent, or Firm—Thomas A. Rendos

[57] ABSTRACT

An improved electromechanical actuator controller or system, counteracting the control stability degradation caused by motor interaction with the load dynamics (actuator compliance), having decreased sensor noise sensitivity responses and minimal compensation implementation requirements. The controller includes a motor rate sensor and an actuator position sensor, whose signal outputs are combined in a complimentary filter to blend the dissimilar sensor signals to achieve the desired control signal. The complementary filter time constant is chosen to result in a stabilizing quadratic phase lead which allows the controller bandwidth to be increased to provide the desired faster electromechanical actuator controller time responses.

6 Claims, 6 Drawing Sheets

FIG.4

| SYMBOL | VALUE | UNITS | DESCRIPTION |
|---|---|---|---|
| Ka | 5.3 | volts/volt | Gain |
| $\tau_{lead}$ | .073 | sec | Compensator Lead t Time Constant |
| $\tau_{lag}$ | .0073 | sec | Compensator Lag Time Constant |
| Kd | 2.5 | amps/volt | Current Driver Gain |
| Ksens | 2.6 | volts/in | Position Sensor Gain |
| $\tau_f$ | .314 | sec | Complementary Filter Time Constant |
| Km | .294 | in-lbs | Motor Torque Gain |
| n | 1 | — | Number of Operating Motors |
| Jm | $4.25 \times 10^{-5}$ | slug-ft$^2$ | Motor & Gear Moment of Inertia at Rotor |
| N$_1$ | 6.85 | rad/rad | Gear train ratio |
| N$_2$ | 50.27 | rad/in | Ball screw ratio |
| Kt | 25000 | lbs/in | Total stiffness of EMA/structure |
| Ks | 50000 | lbs/in | Structural Stiffness |
| La | 6.75 | in | Effective Linkage Arm |
| I | 96.06 | slug-ft$^2$ | Engine Moment of Inertia About Gimbal |
| B | 1000 | ft-lbs/rps | Load damping coefficient |

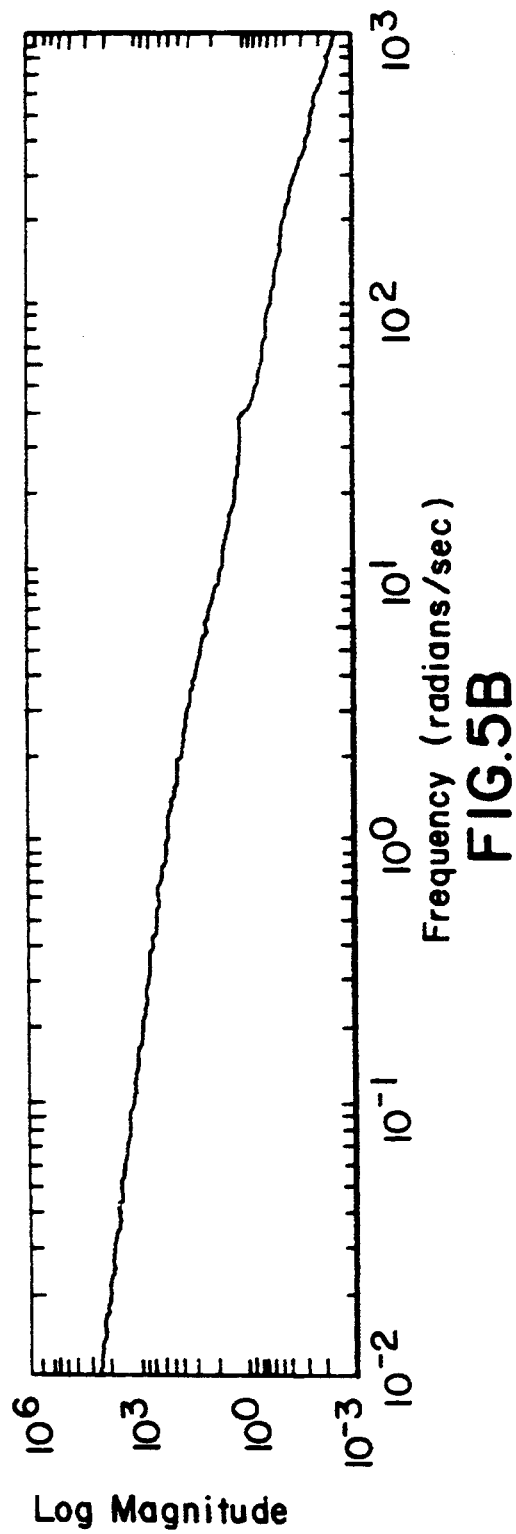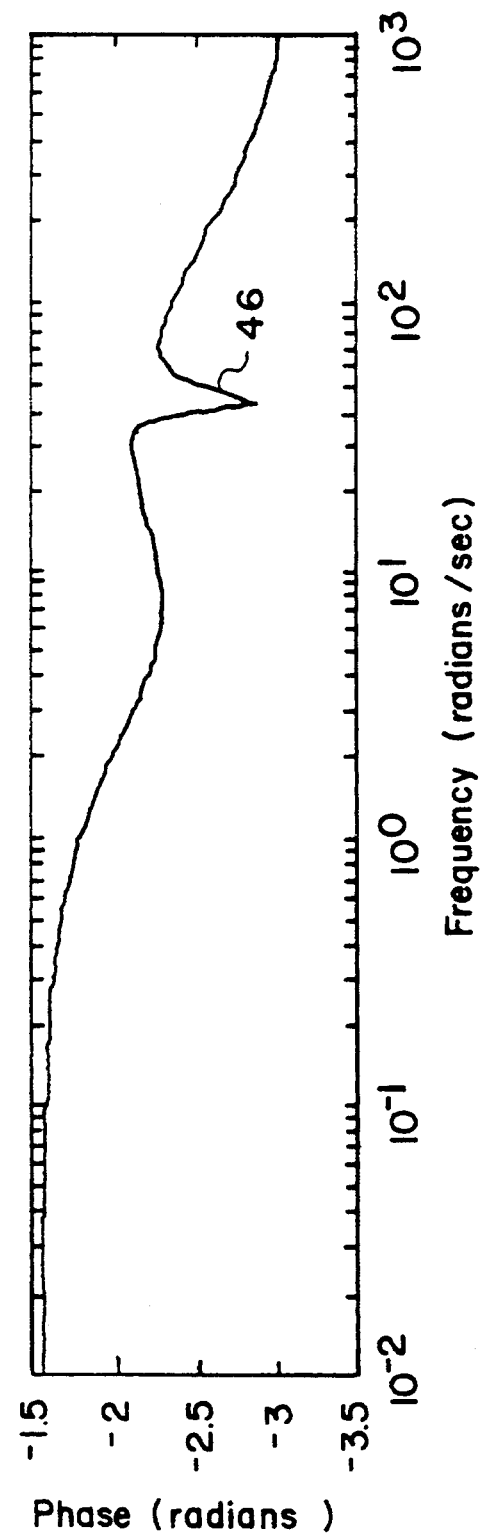
FIG.5A
FIG.5B

ELECTROMECHANICAL ACTUATOR CONTROLLER

FIELD OF THE INVENTION

The present invention relates generally to controlling electromechanical actuators, and more particularly to improving position control stability when the electromechanical actuator is coupled to a compliant load utilizing a complementary filter to blend dissimilar sensor input signals to the electromechanical actuators.

BACKGROUND OF THE INVENTION

The precise control of electromechanical actuators is important in numerous applications, such as typical aircraft control surface applications. In such applications, as the bandwidth of a system approaches that of the load natural frequency, instability can result. The dynamic interaction of the motor and a compliant load can lead to undesirable phase lag which results in degraded closed loop system stability. The control signal is sensitive to noise generated by the sensor being utilized, such as a tachometer for sensing motor rate. Typically, only a single position sensor is utilized and such a sensor generally is not accurate over the whole system operating bandwidth. Also, compensation to stabilize the motor control loop in the region of the motor/load natural frequency can be complicated and expensive.

Complementary filters can be utilized to combine or reconstruct a signal from an assortment of dissimilar sensor measurement signals. For example, in the flight control industry, a barometric altitude sensor signal and an acceleration sensor signal are combined to obtain an estimate of the verticle speed of a vehicle. The benefit is a more accurate signal over the system operational frequency range than the signals of any of the individual sensors alone.

It therefore would be desirable to provide an electromechanical actuator control loop that eliminates undesirable phase lag that degrades system stability, with reduced control loop noise sensitivity, and reduced compensation complexity.

SUMMARY OF THE INVENTION

The present invention is directed to an improved electromechanical actuator controller or system that counteracts the control stability degradation caused by motor interaction with a compliant load, has decreased sensor noise sensitivity, fast time responses and minimal compensation requirements. The electromechanical actuator controller includes a motor rate sensor and an actuator position sensor, whose outputs are combined in a complimentary filter to blend the dissimilar sensor signals to achieve the desired control signal. The complementary filter time constant is chosen to result in a stabilizing quadratic phase lead which allows the controller bandwidth to be increased to provide the desired faster electromechanical actuator controller time responses.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

FIG. 4 is a table of parameters of one electromechanical controller example;

FIG. 5A and 5B are frequency response graph without the complimentary filter of the present invention;

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DESCRIPTION OF THE PREFERRED EMBODIMENT

Figure 1:
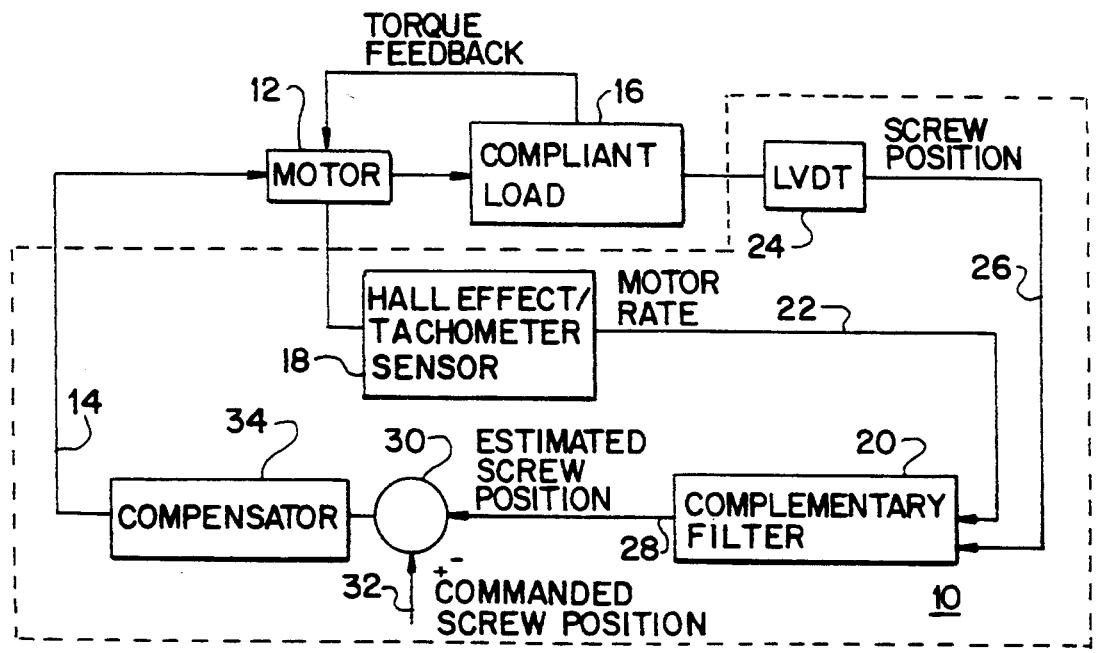
FIG. 1 is a schematic block diagram of one embodiment of the electromechanical actuator controller of the present invention.

Referring to FIG. 1, one embodiment of the electromechanical actuator controller of the present invention is designated generally by the reference numeral 10. The controller 10 is coupled to and controls a motor 12. The controller 10 is coupled to the motor 12, such as a DC brushless motor, by a line 14. The torque of the motor 12 is proportional to the current supplied to the motor 12 and hence the controller 10 provides a torque command current on the line 14.

The motor 12 is coupled to and drives a compliant load 16, which can be driven by an actuator, such as a rotatable screw (not illustrated). The compliant load 16 can be an engine thrust vector controller or an aircraft control surface. The controller 10 employs a pair of sensors to sense or measure the position of the motor 12 or the compliant load 16. The motor position can be measured by a Hall Effect/Tachometer sensor 18. The sensor 18 monitors the motor rate to measure the motor position and sends a position signal to a complimentary filter 20 via a line 22. The sensor 18 provides an accurate position measurement at high frequencies, but is relatively inaccurate at low frequencies, e.g. on the order of 0.5 cycles/second.

A linear voltage transformer, such as an LVDT sensor 24 is coupled to the compliant load 16 to monitor the screw position of the compliant load 16 and to send a second position signal to the complimentary filter 20 via a line 26. The sensor 24 provides an accurate position measurement at low frequencies, but is relatively inaccurate at high frequencies, e.g. on the order of four (4) to five (5) cycles per second.

The complimentary filter 20 combines or blends the two dissimilar sensor measurements to generate an estimated position signal, which is more accurate over the whole frequency range than the signals of either of the sensors 18 or 24 alone. The estimated position signal is coupled via a line 28 to a comparator 30. The comparator 30 receives a second command screw position signal via a line 32. The command screw position is compared to the estimated position signal and the comparator 30 generates a difference signal which is coupled to a compensator 34. The compensator 34 conditions the comparator 30 output signal to generate the motor torque command current (signal) such that the required stability margins and closed loop bandwidth are achieved.

Figure 2:
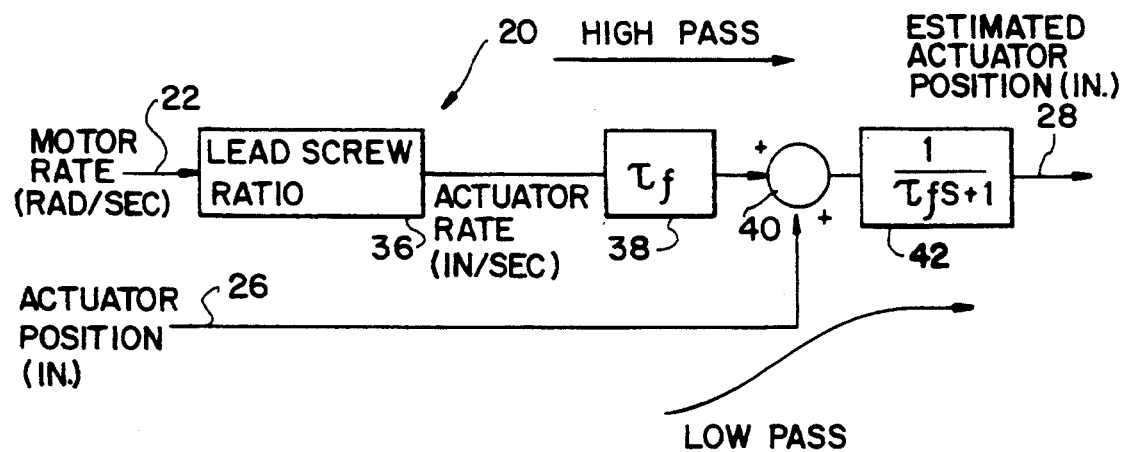
FIG. 2 is a schematic diagram of the feedback signal conditioning of the complementary filter of the present invention.

The complimentary filter 20 generates the more accurate estimated position signal by blending or combining the two sensor measurements together by applying a frequency dependent weight to each of the signals, as illustrated in FIG. 2. The relative weight is based upon the signal/noise ratio characteristics of each of the sensors utilized to generate each signal. By properly selecting the time constant ($\tau f$), we have discovered that the inherent destabilizing quadratic phase lag resulting from the combined dynamics of the motor 12 and the compliant load 16 can be changed to a stabilizing quadratic phase lead. As a result of this phase change, the bandwidth of the controller 10 can be increased and hence, a faster controller time response can be obtained without being concerned with a significant phase lag in the crossover region.

One example of the conditioning of the complimentary filter 20 is illustrated in FIG. 2. The motor rate signal on the line 22 is generated in radians per second and is coupled to a screw ratio factor 36 to convert the signal into inches per second to provide an actuator (motor) rate signal. The actuator rate signal is multiplied by the time constant illustrated by a block 38 and then added to a summing node 40.

Since the sensor 18 exhibits a good high frequency response, the motor rate signal is weighed utilizing a first order high pass filter, as illustrated. The sensor 24 exhibits the opposite good low frequency response and hence the signal from the sensor 24 is coupled on the line 26 directly to the node 40. This provides the sensor 24 signal with a first order low pass filter weighing, which is the complement of the signal.

The summed signals from the node 40 are multiplied by the first order lag filter as shown by the block 42. The output of the block 42 is the more accurate estimated position signal output on the line 28. The complimentary filter 20 is not restricted to a first order filter, as illustrated. If the characteristic of the signals to be blended require more attenuation, then a higher order filter would be implemented. For example, the low pass signal would be passed through a multiple order transfer function G(S), while the complement transfer function 1-G(S) would be utilized as a high pass filter for the other signal.

Figure 3:
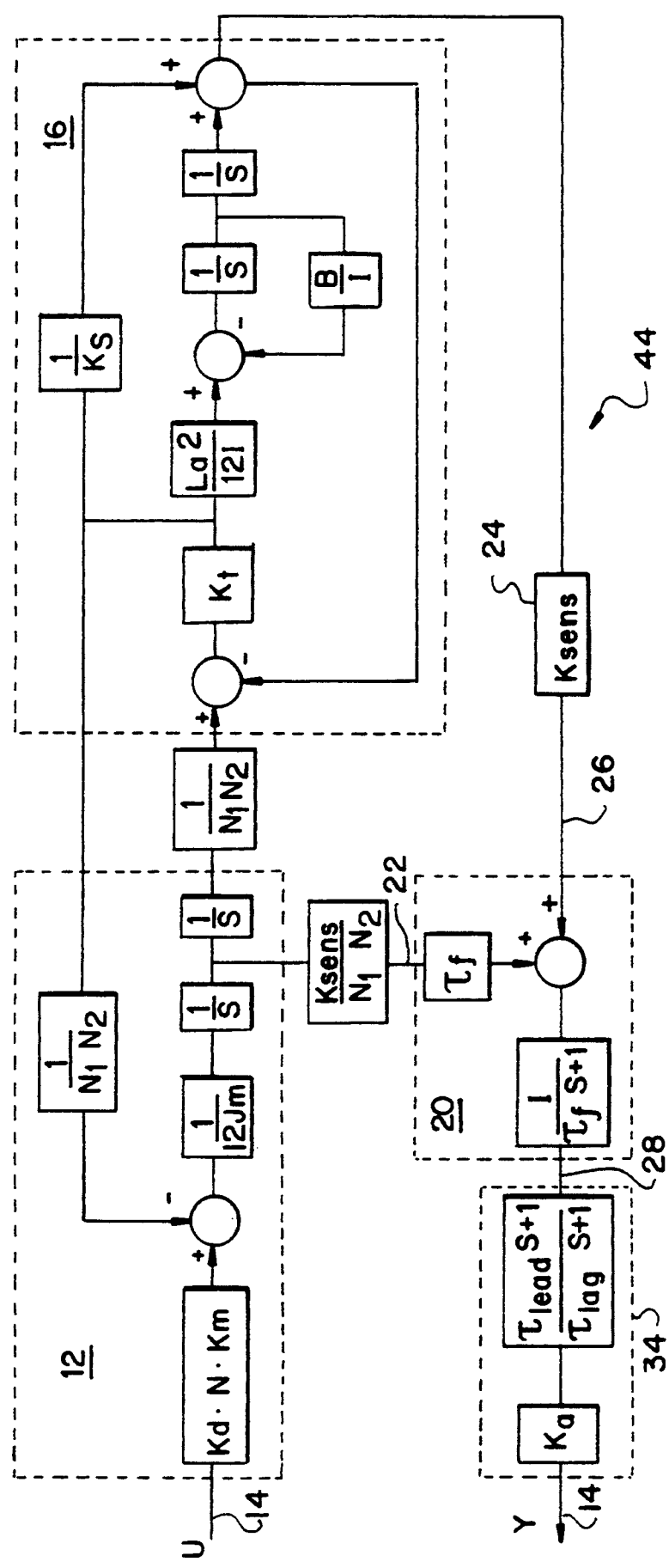
FIG. 3 is a mathematical model of the electromechanical actuator controller.

A mathematical model 44 of the controller 10 utilizing lead/lag phase compensation and complementary filtering is illustrated in FIG. 3. The corresponding elements previously designated are identified in the model 44. The block 12 represents the motor 12 and the motor drive. The block 16 represents the load dynamics.

If the parameters illustrated in FIG. 4 are assumed for the controller 10 with a time constant of zero, then the complementary filter 20 effectively is eliminated. The open loop Bode response for the time constant of zero is illustrated in FIGS. 5A and 5B. The compensator gain and lead/lag time constant were selected to add a phase lead of fifty-five (55) degrees and to place the crossover near the natural frequency of the load dynamics. This results in a significant valley 46 in the incremental phase contribution of the dipole, which results in a decreased phase margin for the controller 10.

Figure 6A:
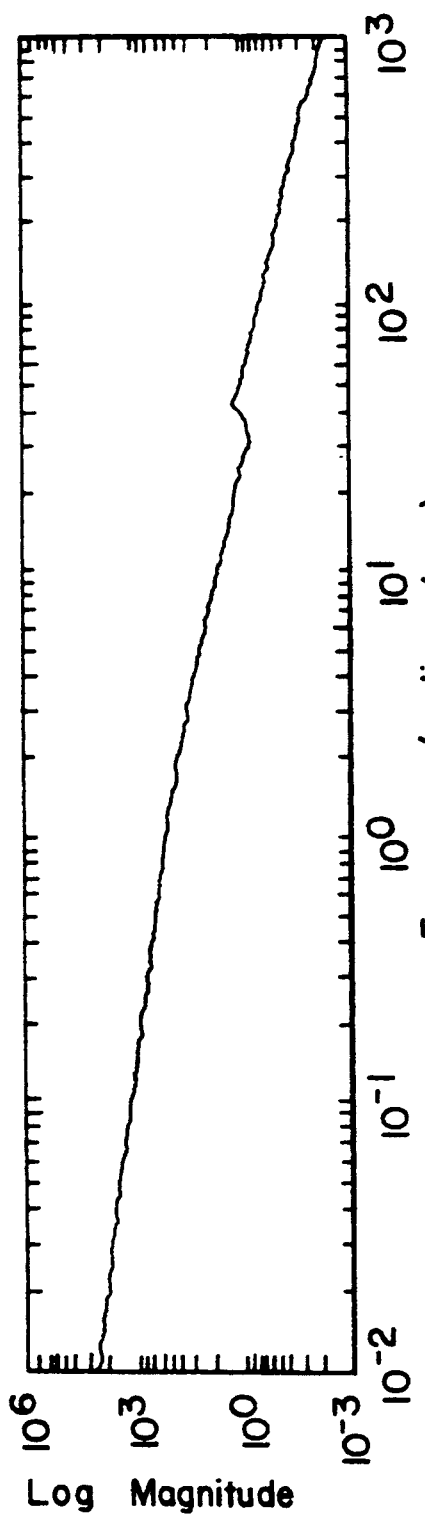
FIG. 6A and 6B are frequency response graph with the complimentary filter of the present invention.
Figure 6B:
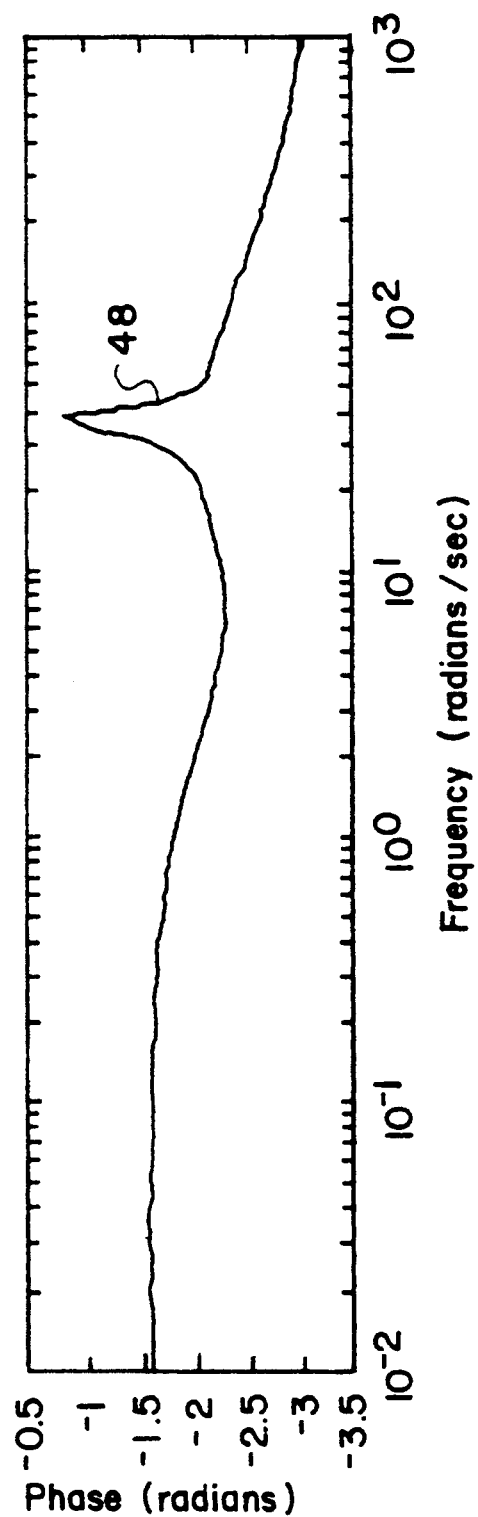

If the complimentary filter 20 is enabled and the time constant is set to equal 0.314 seconds then the open loop Bode response is illustrated in FIGS. 6A and 6B. The incremental phase contribution of the dipole is now a peak 48 which results in an increased phase margin.

Figure 7:
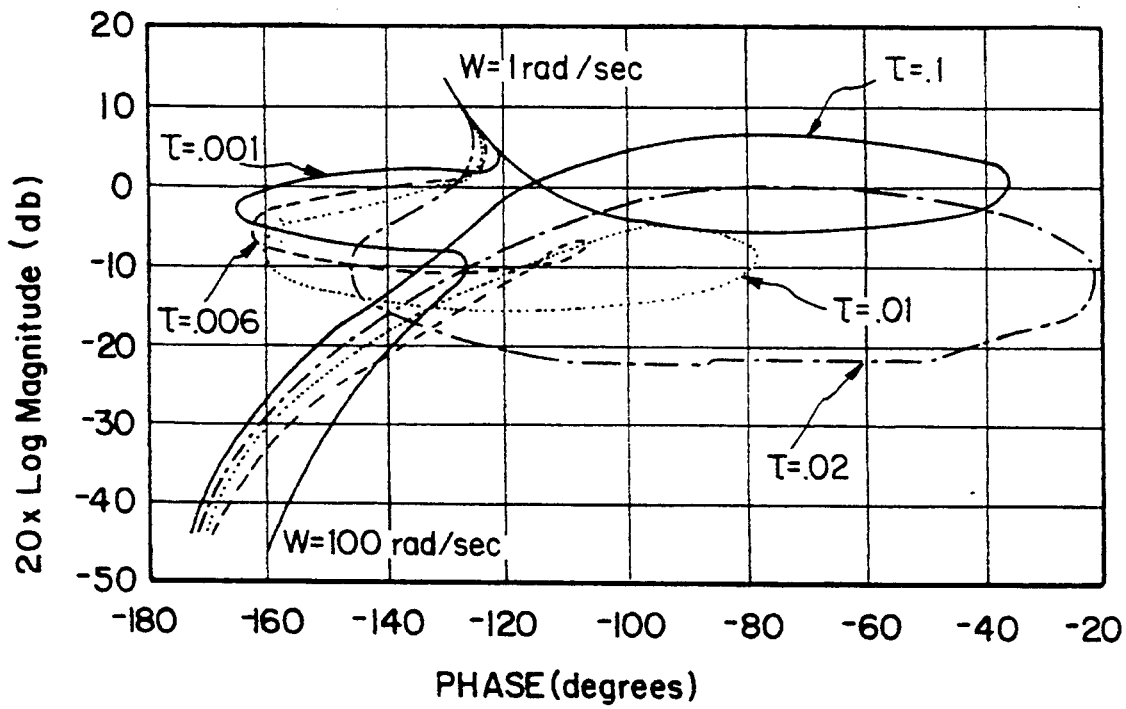
FIG. 7 is a frequency response graph, of the system that illustrates the phase contribution of the load dynamics as a function of the complimentary filter time constant.

FIG. 7 illustrates the gain and phase characteristics in Nichols chart form of the open loop transfer function of the controller 10, as a function of the time constant of the complimentary filter 20. It is observed that the phase margin increased as the time constant of the complimentary filter 20 is increased. The reason that the complimentary filter 20, as implemented in FIG. 2, changes the polarity of the phase angle contribution of the quadratic dipole is illustrated by examining the open loop transfer function of the control loop (FIG. 3) as follows:

The open loop transfer function is equation (1).

$$\frac{y}{u}(S) = \frac{\left(Ka\frac{KdnKm}{12Jm}\frac{Ksens}{N_1N_2}\tau_f\right)(t_{lead}S + 1)\left\{S^3 + \left(\frac{K_t}{\tau_fK_s} + \frac{B}{I}S^2\right) + \left(K_t\frac{La^2}{12I} + \frac{K_t}{\tau_fK_s}\frac{B}{I}\right)S + \frac{K_t}{\tau_f}\frac{La^2}{12I}\right\}}{S(t_{lag}S + 1)(\tau_fS + 1)\left\{S^3 + \frac{B}{I}S^2 + \left[K_t\frac{La^2}{12I} + \frac{K_t}{12Jm}\frac{1}{(N_1N_2)^2}\right]S + \frac{B}{I}\frac{K_t}{12Jm}\frac{1}{(N_1N_2)^2}\right\}}$$

When the complementary filter 20 is disabled ($\tau f = 0$), only the screw position signal on line 26 is fed back and the open loop transfer function can be written as equation (2).

$$\frac{y}{u}(S) = \frac{\left(Ka\frac{KdnKm}{12Jm}\frac{Ksens}{N_1N_2}\right)\frac{Kt}{Ks}\left[S^2 + \frac{B}{I}S + Ks\frac{La^2}{12I}\right](t_{lead}S + 1)}{S(t_{lag}S + 1)\left\{S^3 + \frac{B}{I}S^2 + \left[Kt\frac{La^2}{12I} + \frac{Kt}{12Jm}\frac{1}{(N_1N_2)^2}\right]S + \frac{B}{I}\frac{Kt}{12Jm}\frac{1}{(N_1N_2)^2}\right\}}$$

Enabling the complementary filter 20 by assuming a very large time constant ($\tau f \to \infty$) results in the open loop transfer function defined by equation (3).

$$\frac{y}{u}(S) = \frac{Ka \frac{KdnKm}{12Jm} \frac{Ksens}{N_1N_2}\left(S^2 + \frac{B}{I}S + Kt\frac{La^2}{12I}\right)(t_{lead}S + 1)}{S(t_{lag}S + 1)(t_fS + 1)\left\{S^3 + \frac{B}{I}S^2 + \left[Kt\frac{La^2}{12I} + \frac{Kt}{12Jm}\frac{1}{(N_1N_2)^2}\right]S + \frac{B}{I}\frac{Kt}{12Jm}\frac{1}{(N_1N_2)^2}\right\}}$$

It is observed that the natural frequency of the numerator quadratic lead term has decreased from $$Wn = \sqrt{Ks\frac{La^2}{12I}}$$

$(tf = 0)$ to $$Wn = \sqrt{Kt\frac{La^2}{12I}}$$

$(tf \to \infty)$ as the complementary filter 20 time constant $\tau f$ is increased from 0 to infinity. Also, it is observed that the cubic term of the denominator remains unchanged as a function of $\tau f$. The cubic term $$\left(S^3 + \frac{B}{I}S^2 + \left[Kt\frac{La^2}{12I} + \frac{Kt}{12Jm}\frac{1}{(N_1N_2)^2}\right]S + \frac{B}{I}\frac{Kt}{12Jm}\frac{1}{(N_1N_2)^2}\right)$$

can be factored into a first order term and a second order term based on the relative magnitude of the coefficients that result when the numerical values from FIG. 4 are assigned to the controller 10 parameters. This results in equation (5)

$$S_3 + \frac{B}{I}S^2 + \left[Kt\frac{La^2}{12I} + \frac{Kt}{12Jm}\frac{1}{(N_1N_2)_2}\right]S +$$

$$\frac{B}{I}\frac{Kt}{12Jm}\frac{1}{(N_1N_2)^2}\left[S + \frac{B}{I + Jm(LaN_1N_w)^2}\right]\left(S^2 + \right.$$

$$\left.\frac{B}{I}\left[\frac{Jm(LaN_1N_2)^2}{I + Jm(LaN_1N_2)^2}\right]S + \frac{KtLa^2}{12I}\left[1 + \frac{I}{Jm(LaN}\right.\right.$$

The natural frequency of the quadratic lag term is $$Wn = \sqrt{\frac{KtLa^2}{12I}\left[\frac{I}{Jm(LaN_1N_2)^2}\right]}$$

$0 < \tau f < \infty$

Figure 8:
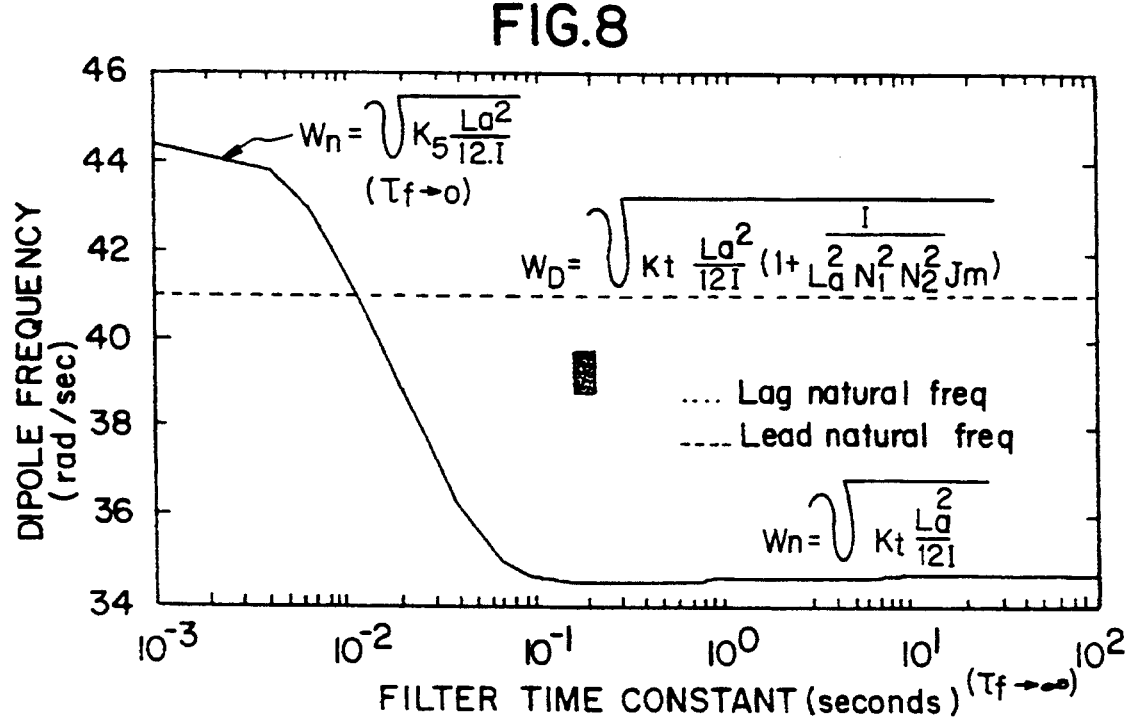
FIG. 8 is a graph of load dynamics dipole frequencies plotted against a varied complimentary filter time constant.

FIG. 8 illustrates how the natural frequencies of the dipole migrate as a function of the complementary filter time constant. For the system parameters of FIG. 4, it is observed that the phase of the dipole changes polarity (phase lag to phase lead) as the complementary filter time constant increases past approximately 0.012 sec. Since the quantity $$\frac{I}{Jm(LaN_1N_2)^2} > 0$$

the lag natural frequency will always lie above the lead natural frequency for large time constants, i.e.

$$\sqrt{Kt\frac{La^2}{12I}\left[I + \frac{I}{Jm(LaN_1N_2)^2}\right]} > \sqrt{Kt\frac{La^2}{12I}}$$

This fact guarantees that the complementary filter 20 will always create a dipole phase lead situation when the time constant is properly selected.

The controller 10 with the complimentary filter 20 results in several desirable benefits for the load position control. First, the blending of the multiple sensor outputs utilizing the complimentary filter 20 improves the signal and noise quality in generating the estimated position signal utilized for the controller feedback. Second, the complimentary filter 20 with the proper time constant removes the undesirable phase lag characteristics of the combined motor/load dynamics. With the phase lag removed, the bandwidth of the controller 10 can be increased beyond that of conventional controller which results in faster controller time responses. Third, the compensation complexity and subsequent implementation costs are reduced because the complementary filter 20 generates an estimated actuator position 28 that phase stabilizes the load dynamics. If the complimentary filter 20 were not employed, the compensator would have to be a design that incorporates a structural filter (2nd order or higher) to stabilize the load dynamics.

The embodiments of an invention in which an exclusive property or right is claimed are defined as follows:

1. A method of controlling a motor driven electromechanical actuator for driving a compliant load, said method comprising the steps of:
   generating a position signal representative of said motor driven electromechanical actuator;
   generating a rate signal representative of a rate of a motor of said motor driven electromechanical actuator;
   applying a frequency dependent weight to said position signal and said rate signal utilizing complementary filters;
   summing said weighted position signal and said weighted rate signal utilizing said complementary filters to generate a combined estimated position actuator signal having a positive phase lead; and
   comparing said combined estimated position actuator signal to a command position signal to generate a motor control signal for control of said motor.

2. A method according to claim 1, wherein said motor driven electromechanical actuator includes a rotatable screw, said position signal generating step including the step of sensing a position of said rotatable screw to generate said position signal.

3. A method according to claim 2, wherein a linear voltage transformer senses said position of said rotatable screw for generating said positioning signal and a tachometer senses said rate of said motor for generating said rate signal.

4. A method according to claim 1, wherein said frequency dependent weight applying step includes the step of selecting a time constant such that an inherent destabilizing phase lag resulting from combined dynamics of said motor and said load is corrected to a stabilizing phase lead.

5. An apparatus to control a motor driven electromechanical actuator for driving a compliant load, said apparatus comprising:
   first sensor means for generating a position signal representative of said motor driven electromechanical actuator;
   second sensor means for generating a rate signal representative of a rate of a motor of said motor driven electromechanical actuator;
   complementary filter means for combining said position signal and rate signal to generate a combined estimated position actuator signal using a time constant selected such that an inherent destabilizing phase lag resulting from combined dynamics of said motor and said load is corrected to a stabilizing phase lead, said complementary filter means including:
   a high pass filter means for weighting said position signal;
   a low pass filter means for weighting said rate signal; and
   means for summing the weighted position signal and the weighted rate signal
   resulting in said combined estimated position actuator signal; and
   means for comparing said combined estimated position actuator signal to a command position signal to generate a motor control signal for control of said motor.

6. An apparatus according to claim 5, wherein said motor driven electromechanical actuator includes a rotatable screw, wherein said first sensor means includes a linear voltage transformer, and wherein said second sensor means includes a tachometer.

* * * * *

UNITED STATES PATENT AND TRADEMARK OFFICE
CERTIFICATE OF CORRECTION

PATENT NO. : 5,367,237            Page 1 of 2
DATED     : November 22, 1994
INVENTOR(S) : Jeffrey R. Ring, Reinhold Matulenko It is certified that error appears in the above-indentified patent and that said Letters Patent is hereby corrected as shown below:

On the the title page, at item [56] under References Cited, U.S. PATENT DOCUMENTS, the following cited references should be added:

| | | | |
|---|---|---|---|
| 4,059,064 | 11/1977 | Dickey | 114/144 |
| 4,463,605 | 8/1984 | McDowell, et al. | 73/432 SD |
| 3,035,795 | 5/1962 | Larson | 244/77 |

On the title plage, at item [56] under References Cited, please add

FOREIGN PATENT DOCUMENTS:

| | | | |
|---|---|---|---|
| 2132385 | 7/1984 | Great Britain | H02P 8/00 G05D 3/12 |
| 8804444 | 6/1988 | WIPO | G05D 1/08, B64C 13/00 |
| 1406430 | 8/1969 | GERMANY | G05D 1/08 B2B |

UNITED STATES PATENT AND TRADEMARK OFFICE
CERTIFICATE OF CORRECTION

PATENT NO. : 5,367,237

DATED : November 22, 1994

INVENTOR(S) : Jeffrey R. Ring, Reinhold Matulenko

It is certified that error appears in the above-indentified patent and that said Letters Patent is hereby corrected as shown below:

On the title page, at item [56] under References Cited, please add

OTHER PUBLICATIONS:
Tsujisawa Takahiko, Patent Abstracts of Japan (JP 4245079) "Control System for Positioning Head", 1/92, page 1/1.

Signed and Sealed this

Twenty-eight Day of February, 1995

*Attest:*

BRUCE LEHMAN

*Attesting Officer*     *Commissioner of Patents and Trademarks*